UNITED STATES PATENT OFFICE.

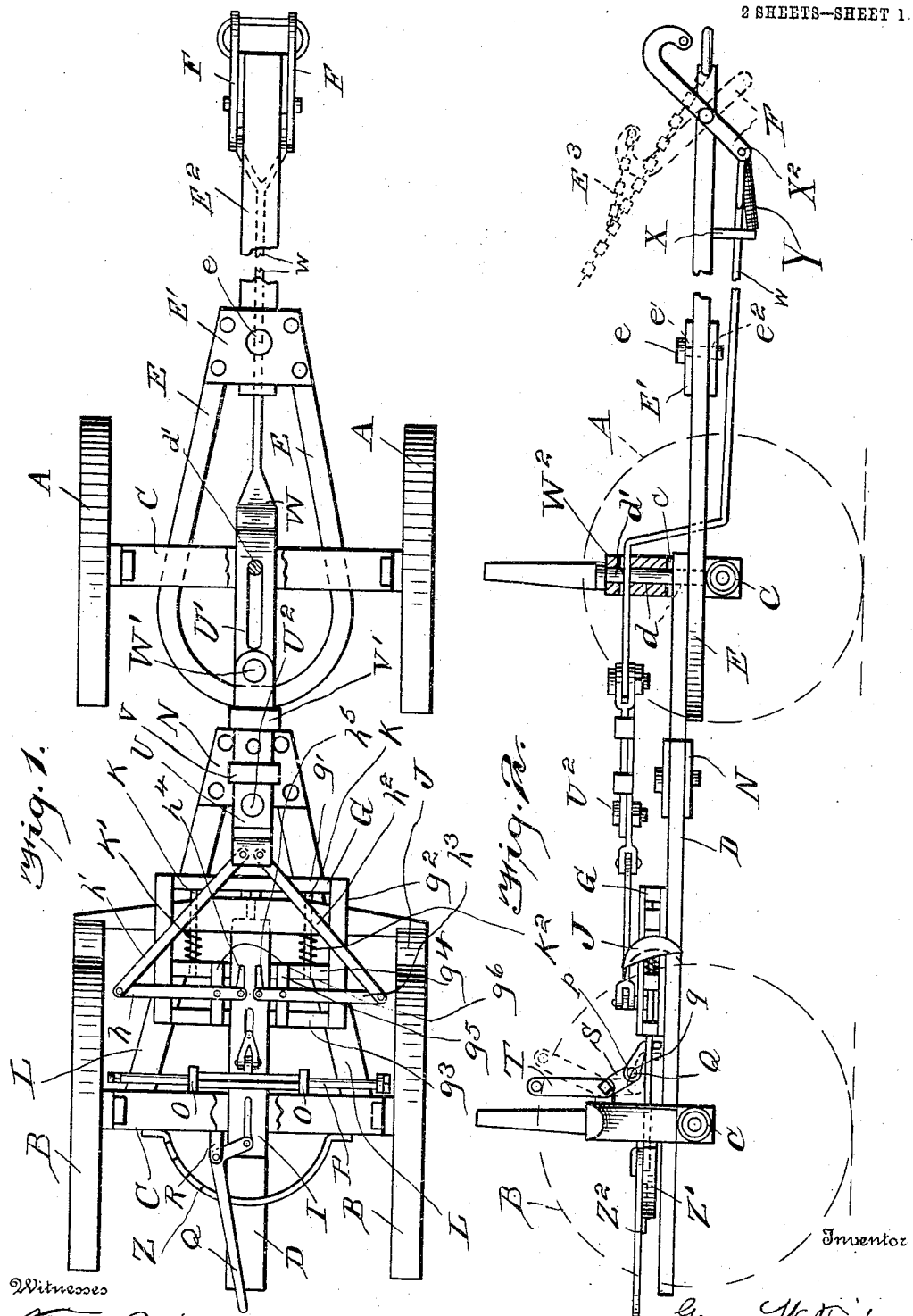

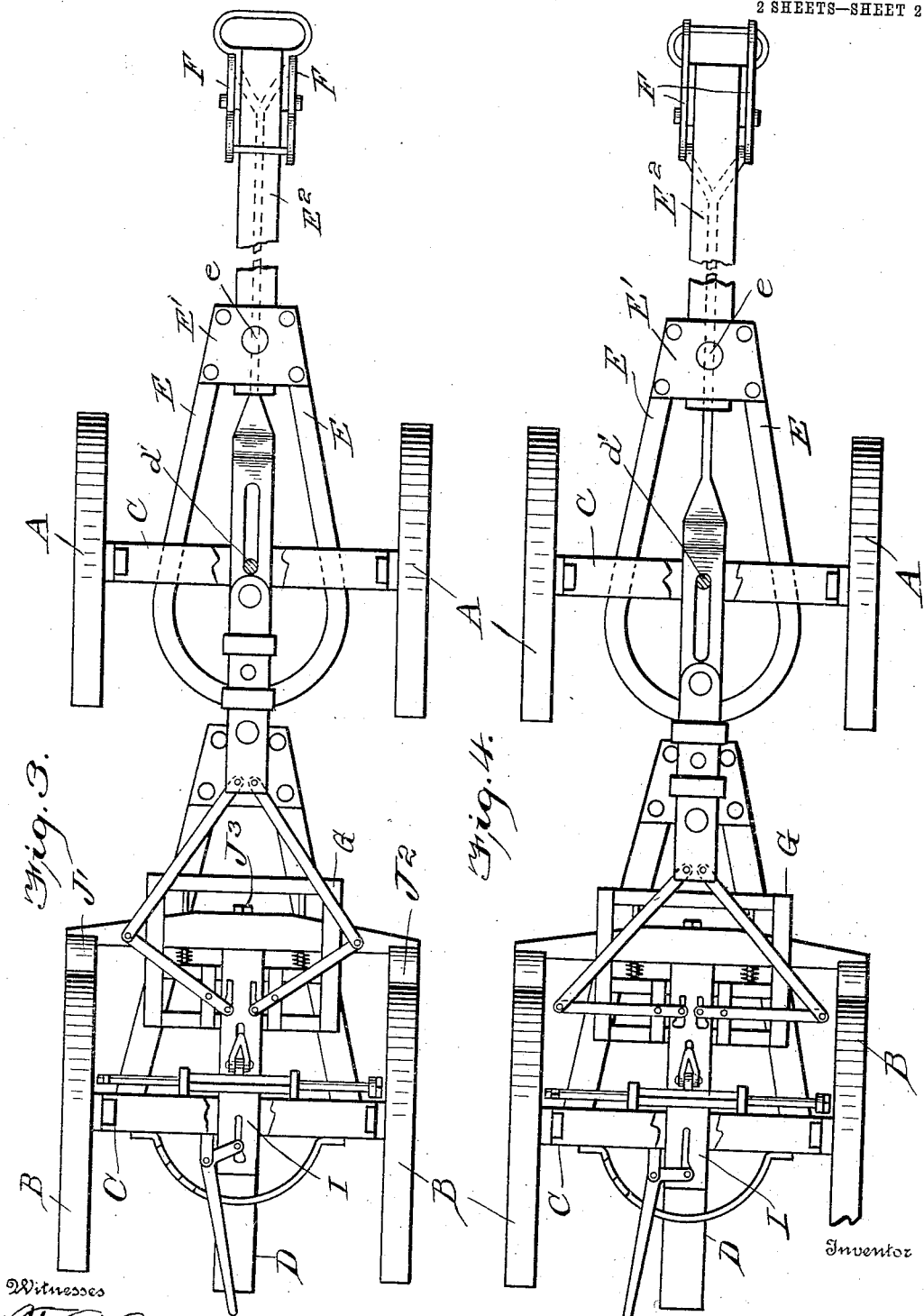

GEORGE W. FISHER, OF WESTERN RUN, MARYLAND.

AUTOMATIC BRAKE FOR VEHICLES.

948,418.  Specification of Letters Patent.  Patented Feb. 8, 1910.

Application filed February 11, 1909. Serial No. 477,351.

*To all whom it may concern:*

Be it known that I, GEORGE W. FISHER, citizen of the United States, residing at Western Run, in the county of Baltimore and State of Maryland, have invented certain new and useful Improvements in Automatic Brakes for Vehicles, of which the following is a specification.

My invention relates to improvements in automatic brakes for vehicles, and the object thereof is to improve and simplify the construction over the existing prior state of the art; and the invention consists in the novel construction and combination of parts as will be hereinafter more in detail described and the asserted novelty specifically claimed.

I have fully and clearly illustrated my invention in the accompanying drawings, in which, Figure 1 represents a top or plan view of my invention to which my improvements are applied. Fig. 2 represents a longitudinal side elevation of the same, and Figs. 3 and 4 are also plan views thereof.

Similar letters of reference indicate corresponding parts in the several figures.

Referring to the drawings: A, A designate the forward wheels and B, B the rear wheels of a wagon mounted upon the forward and rear axles C and C respectively in the ordinary manner.

D designates the reach or connecting bar connecting the forward and rear axles together, openings $c$ being formed centrally between the bolster and forward axle C and through which said reach is projected, the reach D and also the bolster of the forward axle C being provided with a perforation $d$ for the reception of the usual king bolt $d'$ for the turning thereon of the forward axle, bolster and reach of the wagon.

E, E designate the hounds of the forward axle which are passed transversely through the opening, between the bolster and the forward axle C and in which they are held at this point, the forward ends of said hounds being provided with a slotted clip E' through which a tongue E$^2$ is passed and secured within the clip by means of a screw $e$ passed through perforations $e'$, $e^2$ formed in said clip and the rear end of the tongue, a tongue cap being secured to the forward end of the tongue to admit of the engagement of a chain E$^3$ and twin hooks F, F, the latter being pivotally secured to this end of the tongue, as more clearly shown in Fig. 2 of the drawings.

G designates the frame work of the brake operating mechanism of the wagon composed of side and end bars $g'$, $g^2$ and $g^3$ and an inner bar $g^4$ located parallel with the side bars $g'$ and $g^3$ and to these bars $g^3$ and $g^4$ are transversely secured short bars $g^5$ and $g^6$ which serve as a support for a number of toggle-jointed levers $h$, $h'$, $h^2$, $h^3$ which are pivotally secured near their ends to said bars $g^5$ and $g^6$ the ends of said levers $h$, $h^3$ engaging parallel slots $h^4$, $h^5$ formed in and near the forward end of a bar I secured centrally and at right angles to a brake shoe bar J having brake shoes J', J$^2$ secured to its ends.

K, K designate short pins having their ends secured in the side bar $g'$ and the inner parallel bar $g^4$ near the ends of said bars on which spiral springs K', K$^2$ loosely play backwardly and forwardly, these pins also being passed through perforations in the brake shoe bar for a purpose which will hereinafter more fully appear.

L, L designate the rear hounds, the rear ends of which are secured and passed between the rear axle C and bolster of the wagon, the forward ends of the hounds converging to the reach D and secured within the slotted clip N.

O, O designate eye-bolts secured to the rear axle C in any suitable manner. Through these eye-bolts O, O is transversely passed a roller P for side locking the wagon.

Q designates a hand-lever pivotally secured to the rear axle C through the medium of an eye-bolt plate R, this lever having at its pivotal end a right angular bifurcated projection formed integral therewith having a perforation therein through which a pivot is passed pivotally connecting the right angular bifurcated projection with the slot in the bar I.

S designates a lug secured midway the length of the roller P having an eye $p$ therein through which is passed a pin Q' for the purpose of connecting thereto a hook $q$ bifurcated at its rear end, the lug S being passed into this bifurcation the free end of this hook engages the central slot in the bar I heretofore described. To one end of the roller P is detachably secured a hand-lever T by means of which through the medium of the roller P the hook $q$ is manipulated for operating the bar I independently of the automatically disposed draw-bar to be hereinafter described.

U designates a longitudinally centrally located and automatically operated adjustable slotted draw-bar, the rear end of which is pivotally secured to the forward ends of the toggle jointed levers $h'$, $h^2$ connecting with the levers $h$ and $h^3$ of the hand operated bar I. This draw-bar U is made in sections U, U'; the ends of which are slidably passed through loops V, V', overlapped and adjusted and held in adjustment by means of a pivot pin $U^2$. The forward end of the section U is pivotally connected to the section U' so that when it is necessary to adjust the overlapping sections the pivot pin $U^2$ is withdrawn from the sections. The forward end of the upper section U' is bifurcated for the reception of the rear end of a slotted angular bar W which is pivotally connected to the forward end of said section by means of a pivot pin W'.

$W^2$ designates a bolster plate rigidly secured to the top of the bolster and provided centrally with a perforation $d$ which is in alinement with the perforation in the bolster hereinafter described, and as previously stated, is for the reception of the king bolt. This king bolt $d'$ engages the slot in the rear end of the angular portion or section of the draw-bar. The lower angle of this angular section terminates in a rod portion $w$.

X designates a slotted eye-bolt secured to the underside of the tongue through which the rod portion $w$ is passed, and which serves as a guide for said rod. This rod or rod portion of the draw-bar is bifurcated at its extreme outer and forward end, and pivotally connected therewith are the twin hooks F F'' by means of a pivot pin $X^2$ which is passed through alined perforations both in the bifurcated end of the rod and also in alined perforations in the said hooks.

Y designates a coiled spring, one end of which is secured to the slotted eye-bolt, its opposite end being looped and through which is also passed the pivot $X^2$ thus connecting said spring with the bifurcation in the rod portion of the draw-bar and the levers F F.

Z designates a ratchet sector having its ends secured to the ends of the rear hounds.

Z' designates a brace having one end secured to the rear axle C and its opposite end secured centrally to the ratchet sector.

$Z^2$ designates a short blade secured to the underside of the lever which engages the ratchet sector by means of which the bar I and its mechanism is operated.

From the foregoing construction herein shown and described it will be obvious that my device has the advantage of producing a triple motion. Two motions are given to the brake shoes by the rear and side hand levers and by these motions the shoes of the brake bar are applied and locked against the rear wheels when the horse is descending grades and which if necessary will stop the wagon instantly. When the mechanism is operated automatically by means of the horses being controlled in descending grades the wheels will gradually be locked by the brake-shoes, and when the horses are ascending the brake-shoes will be gradually released from the wheels.

By means of the twin hooks detachably secured to the forward end of the tongue and the tongue chains secured to the tongue cap I am enabled by this means to back any load anywhere and under any circumstances, and further by the use of this means after backing up a load the twin hooks regain their normal position.

By adjusting the draw-bar which is made in two parts overlapping each other the wagon gear can be shortened or lengthened at pleasure. When two horses are controlled there can be eight tons hauled down a grade as easily as four tons.

My brake is strong and durable in its construction and in case of a runaway by the horses the stopping of the horses can be easily controlled.

Having thus described my invention what I claim as new and desire to secure by Letters Patent, is,

1. The combination with the rear axle, wheels, rear hounds, bolster, an eye-bolt plate secured to the bolster, a hand lever pivotally secured to the outer end of said plate, a short arm formed integral and at right angles to said hand-lever, the end of the short arm engaging in a slot of a rear draw-bar, a sector ratchet secured to the bolster within which the hand lever engages, eye-bolts secured to the inner side of the bolster, a roller loosely passed through said eye-bolts, a hand-lever detachably secured to the end of the roller, a lug centrally secured to the roller, a bifurcated hook, the rear end of which engages the lug, the hook portion engaging the central slot in the rear draw-bar, the rear draw-bar having parallel slots in its forward end, the pivoted toggle levers, the free ends of the short and rear levers engaging the parallel slots in the forward end of the rear draw-bar, and the opposite ends of the longer levers pivotally secured to the rear end of the forward adjustable draw-bar.

2. The combination with the rear axle, wheels, rear hounds, bolster, an eye bolt plate secured to the bolster, a hand lever pivotally secured to the outer end of said plate, a short arm formed integral and at right angles to said hand lever, the end of the short arm engaging in the rear slot of a rear draw-bar, a sector ratchet secured to the bolster within which the hand-lever engages, eye-bolts secured to the inner side of the bolster, a roller loosely passed through said eye-bolts, a hand-lever detachably secured to the end of said roller, a lug centrally secured to the roller, a bifurcated hook, the rear end of which engages the lug, the hook portion engaging the central slot in the rear draw-bar, the rear draw-bar having parallel slots in its forward end, the pivoted toggle levers, the free ends of the short and rear levers engaging the parallel slots in the forward end of the rear draw-bar, and the opposite ends of the longer levers pivotally secured to the rear end of the forward adjustable draw-bar; of the frame work, of the brake mechanism secured to the rear hounds composed of the side and end bars and parallel inner bar, transverse short bars having their ends secured to the inner parallel bar and one of the side bars, pins having their ends secured to one of the side bars and inner parallel bar, spiral springs operatively and loosely encircling said pins, the pins being passed through the brake-shoe bar, and shoes secured to the ends of said bar.

3. The combination with the rear axle, wheels, rear hounds, bolster, an eye-bolt plate secured to the bolster, a hand lever pivotally secured to the outer end of said plate, a short arm formed integral and at right angles to said hand-lever, the ends of the short arm engaging in the rear slot of the rear draw-bar, a sector ratchet secured to the bolster within which the hand lever engages, eye-bolts secured to the inner side of the bolster, a roller loosely passed through said eye-bolts, a hand-lever detachably secured to the end of the roller, a lug centrally secured to the roller, a bifurcated hook, the rear end of which engages the lug, the hook portion engaging the central slot in the rear draw-bar having parallel slots in its forward end, the pivoted toggle levers, the free ends of the short and rear levers engaging the parallel slots in the forward end of the rear draw-bar, and the opposite ends of the longer levers pivotally secured to the rear end of the forward adjustable draw-bar, the frame-work of the brake mechanism secured to the rear hounds composed of the side and end bars and parallel inner bar, transverse short bars having their ends secured to the inner parallel bar and one of the side bars, pins having their ends secured to one of the side bars and inner parallel bar, spiral springs operatively and loosely encircling said pins, the pins being passed through the brake shoe bar, the brake shoe bar, shoes secured to the end of said bar; of an angular adjustable sectional draw-bar having over-lapping ends and provided with a slot, a bolster having a bolster plate secured thereto having alined perforations both in said plate and bolster, a king pin passed within said perforations and engaging the slot in the adjustable angular sectional draw-bar, a tongue cap secured to the end of the tongue, twin hooks pivotally secured to the end of the tongue and engaging the tongue cap and tongue chain, the latter being rigidly secured to the tongue cap, the forward hounds within a slotted clip, a slotted eye-bolt secured near the end and under side of tongue, and a coil spring having one end secured to the slotted eye-bolt and its opposite end secured pivotally to the twin hooks, substantially as described.

In testimony whereof I affix my signature, in presence of two witnesses.

GEORGE W. FISHER.

Witnesses:
C. M. GOULD,
T. P. BRITT.